US012308149B2

(12) United States Patent
Orimo et al.

(10) Patent No.: US 12,308,149 B2
(45) Date of Patent: *May 20, 2025

(54) COIL COMPONENT USING MAGNETIC BODY AND CIRCUIT BOARD CARRYING SAME

(71) Applicant: TAIYO YUDEN CO., LTD., Tokyo (JP)

(72) Inventors: Yoko Orimo, Takasaki (JP); Shinsuke Takeoka, Takasaki (JP)

(73) Assignee: TAIYO YUDEN CO., LTD, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/395,027

(22) Filed: Dec. 22, 2023

(65) Prior Publication Data

US 2024/0127997 A1 Apr. 18, 2024

Related U.S. Application Data

(63) Continuation of application No. 16/798,904, filed on Feb. 24, 2020, now Pat. No. 11,901,103.

(30) Foreign Application Priority Data

Feb. 28, 2019 (JP) ................................ 2019-036938

(51) Int. Cl.
*H01F 1/147* (2006.01)
*H01F 1/33* (2006.01)
*H01F 41/02* (2006.01)

(52) U.S. Cl.
CPC ........... *H01F 1/14791* (2013.01); *H01F 1/33* (2013.01); *H01F 41/0246* (2013.01)

(58) Field of Classification Search
None
See application file for complete search history.

(56) References Cited

U.S. PATENT DOCUMENTS 11,901,103 B2 * 2/2024 Orimo ....................... H01F 1/33
2011/0267167 A1 11/2011 Ogawa et al.
(Continued)

FOREIGN PATENT DOCUMENTS

JP 2006049625 A 2/2006
JP 2006108475 A 4/2006
(Continued)

OTHER PUBLICATIONS

JP 2017022921 A English Translation (Year: 2017).*
A Notice of Reasons for Refusal issued by the Japanese Patent Office, mailed Feb. 2, 2023, for Japanese related application No. 2019-036938. (2 pages).
(Continued)

*Primary Examiner* — Paul A Wartalowicz
*Assistant Examiner* — Catherine P Smith
(74) *Attorney, Agent, or Firm* — Law Office of Katsuhiro Arai

(57) ABSTRACT

A magnetic body is constituted by grains of a soft magnetic alloy bonded together via an oxide layer, wherein: the soft magnetic alloy is an alloy containing Si by 1 to 5.5 percent by mass, and Cr and/or Al by 0.2 to 4 percent by mass in total, as constituent elements, with Fe and unavoidable impurities accounting for the remainder, wherein a content of Si is more than a content of Cr and Al in total; and the oxide layer contains Si, as well as at least one of Fe, Cr, and Al, where, among Fe, Si, Cr, and Al, Si is contained in the largest quantity based on mass. The magnetic body can have high magnetic permeability.

10 Claims, 1 Drawing Sheet

(56) References Cited

U.S. PATENT DOCUMENTS

| | | | | |
|---|---|---|---|---|
| 2016/0254082 | A1 | 9/2016 | Tanada et al. | |
| 2017/0287605 | A1 | 10/2017 | Tanada | |
| 2018/0281061 | A1* | 10/2018 | Kako | H01F 41/0246 |
| 2019/0131040 | A1* | 5/2019 | Ikeda | H01F 3/08 |

FOREIGN PATENT DOCUMENTS

| | | | | |
|---|---|---|---|---|
| JP | 2011249774 | A | | 12/2011 |
| JP | 2015126047 | A | | 7/2015 |
| JP | 2017022921 | A | * | 1/2017 |
| JP | 2018182040 | A | | 11/2018 |

OTHER PUBLICATIONS

Lou et al., Enhanced magnetic properties and reduced core loss of intergranular insulating Fe—Si soft magnetic composites with three-shell SiO2—Fe2SiO4—SiO2 insulating layer, J. Solid State Chem., 270, 2019, pp. 311-316. (6 pages).

Non-Final Office Action issued by U.S. Patent and Trademark Office, dated Jun. 23, 2023, for U.S. Appl. No. 16/798,904 (8 pages).

Non-Final Office Action issued by U.S. Patent and Trademark Office, dated May 26, 2022, for U.S. Appl. No. 16/798,904 (13 pages).

Notice of Allowance issued by U.S. Patent and Trademark Office, dated Oct. 3, 2023, for U.S. Appl. No. 16/798,904 (13 pages).

* cited by examiner

COIL COMPONENT USING MAGNETIC BODY AND CIRCUIT BOARD CARRYING SAME

CROSS-REFERENCE TO RELATED APPLICATIONS

This application is a continuation of U.S. patent application Ser. No. 16/798,904, filed Feb. 24, 2020, which claims priority to Japanese Patent Application No. 2019-036938, filed Feb. 28, 2019, each disclosure of which is incorporated herein by reference in its entirety. The applicant herein explicitly rescinds and retracts any prior disclaimers or disavowals or any amendment/statement otherwise limiting claim scope made in any parent, child or related prosecution history with regard to any subject matter supported by the present application.

BACKGROUND

Field of the Invention

The present invention relates to a magnetic body and a method for manufacturing the same, as well as a coil component using the magnetic body and a circuit board carrying the same.

Description of the Related Art

In recent years, coil components for applications such as those where they must carry large current, are facing calls for size reduction as well as further large electrical current flow. Since large electrical current amplification of a coil component requires constituting its core using a magnetic material having magnetic-saturation resistance to current, there has been a growing use of iron-based metal magnetic materials—instead of ferritic materials—as the magnetic materials for this purpose.

In general, magnetic bodies used as cores of coil components are manufactured from soft magnetic materials in powder form. Oftentimes soft magnetic metal materials in powder form, characterized by their own low insulation resistances of the individual grains constituting the powder, are used in such a way that the surface of each grain constituting the material is covered with an insulating film for the purpose of adding insulating property.

For example, Patent Literature 1 reports causing Fe-1% Si atomized alloy grains to undergo oxidation reaction for 2 hours at 450° C. in an atmosphere of very low oxygen concentration that has been prepared by mixing water vapor into nitrogen gas and adjusting the relative humidity to 100% (at room temperature), in order to form, on the grain surface, a $SiO_2$ oxide film of 5 nm in film thickness as a result.

Also, when manufacturing a magnetic body from a soft magnetic metal powder, sometimes the soft magnetic metal powder is compacted into a prescribed shape and then the compact is heat-treated, for the purpose of causing the grains to bond together and thereby increasing the strength, or for the purpose of forming an insulating film or growing an insulating film that has already formed, on the grain surface, and thereby electrically insulating the grains from each other.

For example, Patent Literature 1 reports having caused a compact made of a soft magnetic alloy powder with a $SiO_2$ film formed on the grain surface to undergo oxidation reaction—by keeping it for a prescribed time at 450° C. in an ambient gas that has been prepared by mixing water vapor into a nitrogen-5% hydrogen mixture gas using a humidifier and adjusting the relative humidity to 100%—followed by processing in which the temperature is raised to 880° C. and then held for a prescribed time.

Also, Patent Literature 2 reports having heat-treated at 850° C. under an argon atmosphere a compact made of a soft magnetic alloy powder whose grain surface had been coated with a treatment solution containing titanium alkoxides and silicon alkoxides.

Furthermore, Patent Literature 3 reports having heat-treated at 700° C. for 1 hour in the air a compact made of a Fe—Si—Cr soft magnetic alloy powder having a Si compound placed on the surface.

Background Art Literatures

[Patent Literature 1] Japanese Patent Laid-open No. 2006-49625

[Patent Literature 2] Japanese Patent Laid-open No. 2018-182040

[Patent Literature 3] Japanese Patent Laid-open No. 2015-126047

SUMMARY

One means for obtaining a magnetic body of excellent magnetic permeability and other magnetic properties is raising the filling rate of the soft magnetic material in the magnetic body. If a metal is used as the soft magnetic material, however, a need arises to form an insulating film so as to electrically insulate the soft magnetic metal grains from each other, as mentioned above, the result of which is a drop in the filling rate of the soft magnetic metal by the volume of the insulating film. Particularly when the electrical insulating property of the insulating film is low, the film must be formed thickly, which leads to the problem of increased distances among the metal grains and consequent lowering of magnetic properties.

Meanwhile, while increasing the content percentage of Fe in the soft magnetic metal is also known as a means for obtaining a magnetic body with excellent magnetic permeability and other magnetic properties, doing so presents a problem for soft magnetic metals with a high Fe content percentage because the magnetic properties will drop due to oxidation of Fe in the air.

Accordingly, an object of the present invention is to solve the aforementioned problems and provide a magnetic body of high magnetic permeability.

After conducting various studies to solve the aforementioned problems, the inventor of the present invention found that the problems could be solved by ensuring that the soft magnetic alloy constituting the magnetic body has a specific composition of high Fe content, and also by constituting the grains of the alloy in such a way that they will bond together via an oxide layer having a specific composition, and consequently completed the present invention.

To be specific, a first aspect of the present invention to solve the aforementioned problems is a magnetic body constituted by grains of a soft magnetic alloy bonded together via an oxide layer, wherein such magnetic body is characterized in that: the soft magnetic alloy is an alloy containing Si by 1 to 5.5 percent by mass, and Cr or Al by 0.2 to 4 percent by mass in total, as constituent elements, with Fe and unavoidable impurities accounting for the remainder; and the oxide layer contains Si, as well as at least one of Cr and Al, where, among Fe, Si, Cr, and Al, Si is contained in the largest quantity based on mass.

In addition, a second aspect of the present invention is a method for manufacturing a magnetic body, wherein such method for manufacturing such magnetic body includes: preparing a soft magnetic alloy powder that contains Si by 1 to 5.5 percent by mass, and Cr or Al by 0.2 to 4 percent by mass in total, as constituent elements, with Fe and unavoidable impurities accounting for the remainder and where the content of Si is higher than the total content of Cr and Al; compacting the soft magnetic alloy powder to obtain a compact; and heat-treating the compact in an atmosphere of 10 to 800 ppm in oxygen concentration at a temperature of 500 to 900° C. to form an oxide layer on the surfaces of soft magnetic alloy grains, thereby causing the soft magnetic alloy grains to bond together via the oxide layer.

Further, a third aspect of the present invention is a coil component constituted by a conductor wound around the aforementioned magnetic body, while a fourth aspect of the present invention is a circuit board carrying the coil component.

According to the present invention, a magnetic body of high magnetic permeability can be provided.

DESCRIPTION OF THE SYMBOLS

Figure 1:
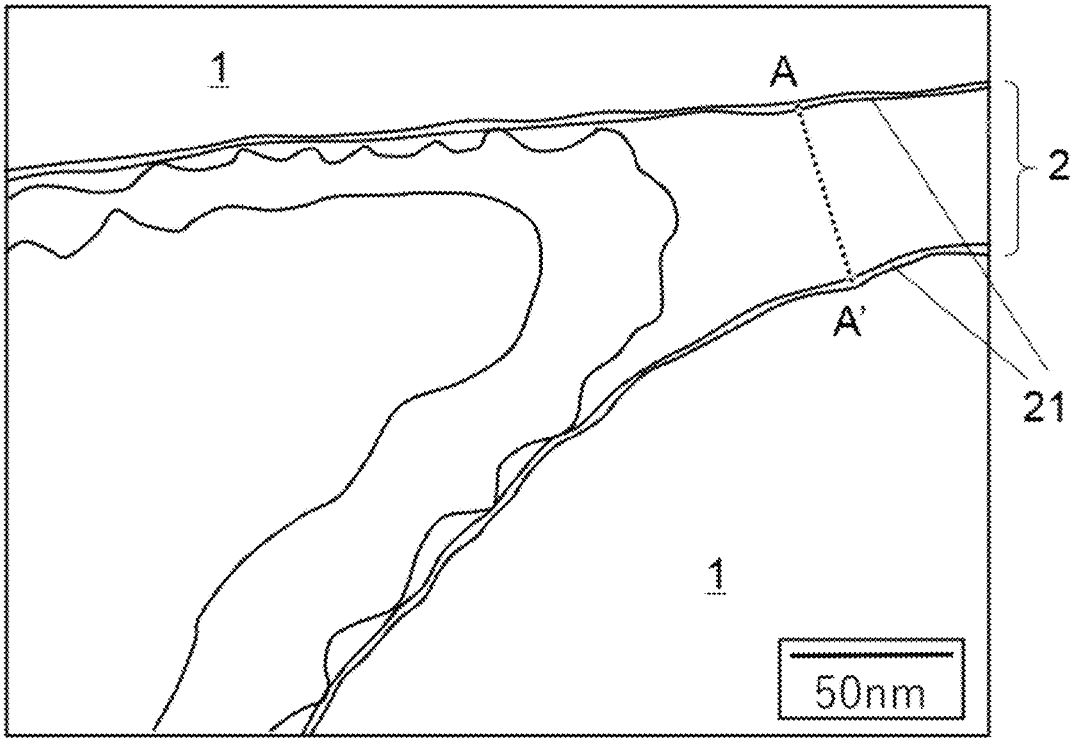
FIG. 1 is a schematic representation showing, using a scanning transmission electron microscope (STEM), the structure of the oxide layer in the magnetic body pertaining to Example 1.

1 Soft magnetic alloy grain
2 Oxide layer
21 Si-rich area
A-A' Location of line analysis

DETAILED DESCRIPTION OF EMBODIMENTS

The constitutions as well as operations and effects of the present invention are explained below, together with the technical ideas, by referring to the drawings. It should be noted, however, that the mechanisms of operations include estimations and whether they are right or wrong does not limit the present invention in any way. Also, of the components in the aspects/embodiments below, those components not described in the independent claims representing the most generic concepts are explained as optional components. It should be noted that a description of numerical range (description of two values connected by "to") is interpreted to include the described values as the lower limit and the upper limit

[Magnetic Body]

The magnetic body pertaining to the first aspect of the present invention (hereinafter also referred to simply as "first aspect") is constituted by grains of a soft magnetic alloy bonded together via an oxide layer, characterized in that: the soft magnetic alloy is an alloy containing Si by 1 to 5.5 percent by mass, and Cr or Al by 0.2 to 4 percent by mass in total, as constituent elements, with Fe and unavoidable impurities (including, e.g., oxygen, hydrogen, nitrogen and unavoidable metal element impurities) accounting for the remainder; and the oxide layer contains Si, as well as at least one of Cr and Al, where, among Fe, Si, Cr, and Al, Si is contained in the largest quantity based on mass.

The soft magnetic alloy in the first aspect contains Si by 1 to 5.5 percent by mass.

When the soft magnetic alloy contains Si by 1 percent by mass or more, its electrical resistance will increase, and lowering of the magnetic properties due to eddy current can be inhibited. The content of Si is preferably 1.5 percent by mass or more, or more preferably 2 percent by mass or more. When the content of Si is 5.5 percent by mass or less, on the other hand, the content of Fe will increase and the magnetic permeability of the magnetic body will rise. The content of Si is preferably 5 percent by mass or less, or more preferably 4.5 percent by mass or less.

Also, the soft magnetic alloy in the first aspect contains Cr or Al by 0.2 to 4 percent by mass in total.

When the soft magnetic alloy contains Cr or Al by 0.2 percent by mass or more in total, excellent oxidation resistance will be achieved. When the content of Cr or Al is 4 percent by mass or less in total, on the other hand, segregation of these elements will be inhibited, while the content of Fe will increase and the magnetic permeability of the magnetic body will rise. To achieve higher magnetic permeability, preferably the total content of Cr or Al is 2 percent by mass or less.

If the soft magnetic alloy contains Cr, then preferably its content is 0.5 percent by mass or more from the viewpoint of achieving superior oxidation resistance.

If the soft magnetic alloy contains Al, then preferably its content is 1 percent by mass or less from the viewpoint of inhibiting its segregation.

Preferably with the soft magnetic alloy in the first aspect, the content of Fe, which significantly affects the magnetic permeability of the magnetic body, is maximized to the extent that desired insulating property and oxidation resistance can be achieved. A preferred content of Fe is 94 percent by mass or more, where 95 percent by mass or more is more preferred, and 96 percent by mass or more is yet more preferred.

In the first aspect, the grains of the soft magnetic alloy having the aforementioned composition are bonded together via an oxide layer that contains Si, as well as at least one of Cr and Al, where, among Fe, Si, Cr, and Al, Si is contained in the largest quantity based on mass.

Because the oxide layer contains Si, as well as at least one of Cr and Al, the rate of movement of oxygen in the layer can be reduced to inhibit the oxygen from reaching the soft magnetic alloy grains to oxidize Fe and consequently lower the magnetic properties.

Also, because the oxide layer contains Si in the largest quantity among Fe, Si, Cr, and Al, excellent electrical insulating property will be achieved. In addition, the fact that the contents of Fe, Cr, and Al are lower than the content of Si in the oxide layer is preferable in the sense that it means an oxide layer of small thickness has been obtained, which will result in a small diffusion flux from the soft magnetic alloy grain to the oxide layer during the manufacture of the magnetic body. Furthermore, the fact that the content of Fe in the oxide layer is low is preferable in the sense that it means the content of Fe in the soft magnetic alloy becomes high.

As described above, high magnetic permeability can be achieved in a stable manner in the first aspect, because the Fe-rich soft magnetic alloy grains are isolated from each other by an oxide film of small thickness having a low rate of oxygen movement and excellent insulating property.

Preferably the oxide layer has an Si-rich area that contains Si by at least three times as much as the element—among Fe, Cr, and Al—whose content is the second highest to Si based on mass, and adjoins the soft magnetic alloy at the Si-rich area. When the oxide layer has such structure, superior electrical insulating property can be achieved. More preferably the Si-rich area has locations where the content of Si based on mass is at least five times that of the element contained in the second largest quantity to Si, and yet more preferably it has locations where the multiple is at least 10 times.

Here, the composition of the soft magnetic alloy and structure of the oxide layer, in the magnetic body, are confirmed according to the procedures below.

First, a thin sample of 50 to 100 nm in thickness is taken from the center part of the inductor core using a focused ion beam (FIB) device, and immediately thereafter a composition-mapping image of the oxide layer is captured per the STEM-EDS method using a scanning transmission electron microscope (STEM) equipped with an annular dark-field detector and an energy-dispersive X-ray spectroscopy (EDS) detector. As for the STEM-EDS measurement conditions, the acceleration voltage is set to 200 kV and the electron beam diameter to 1.0 nm, with the measurement time set in such a way that the integral count of signal strengths that fall in the range of 6.22 to 6.58 keV at each point in the soft magnetic alloy grain part becomes 25 or greater. Then, the area where the ratio of the signal strength of the OKα ray to the total sum of the signal strength of the FeKα ray ($I_{FeK\alpha}$), signal strength of the CrKα ray ($I_{CrK\alpha}$) and signal strength of the AlKα ray ($I_{AlK\alpha}$), or ($I_{OK\alpha}/(I_{FeK\alpha}+I_{CrK\alpha}+I_{AlK\alpha})$), is 0.5 or greater is recognized as the oxide layer, while the area where this value is less than 0.5 is recognized as the soft magnetic alloy.

The composition of the soft magnetic alloy is determined by conducting line analysis of a grain of the soft magnetic alloy in the diameter direction from the oxide layer side according to the STEM-EDS method to measure the distributions of Fe, Si, Cr, and Al, and then calculating the average value of content of each element for the first three measuring points where the content of each such element varies by no more than ±1 percent by mass. It should be noted that, if the composition of the soft magnetic alloy powder used in the manufacture of the magnetic body is known, the known composition may be used as the composition of the soft magnetic alloy.

The structure of the oxide layer is confirmed by conducting line analysis according to the STEM-EDS method along a line segment—in an arbitrary part of the oxide layer where soft magnetic alloy grains are bonded together—continuing from one soft magnetic alloy grain to another soft magnetic alloy grain via the oxide layer, and then measuring the distribution of each element.

[Method for Manufacturing Magnetic Body]

The method for manufacturing magnetic body pertaining to the second aspect of the present invention (hereinafter also referred to simply as "second aspect") includes: preparing a soft magnetic alloy powder that contains Si by 1 to 5.5 percent by mass, and Cr or Al by 0.2 to 4 percent by mass in total, as constituent elements, with Fe and unavoidable impurities (including, e.g., oxygen, hydrogen, nitrogen and unavoidable metal element impurities) accounting for the remainder and where the content of Si is higher than the total content of Cr and Al; compacting the soft magnetic alloy powder to obtain a compact; and heat-treating the compact in an atmosphere of 10 to 800 ppm in oxygen concentration at a temperature of 500 to 900° C. to form an oxide layer on the surfaces of soft magnetic alloy grains, thereby causing the soft magnetic alloy grains to bond together via the oxide layer.

The soft magnetic alloy powder used in the second aspect contains Si by 1 to 5.5 percent by mass as a constitutive element.

When a soft magnetic alloy powder containing Si by 1 percent by mass or more is used, an oxide layer offering excellent electrical insulating property can be formed through the heat treatment mentioned later. The content of Si is preferably 1.5 percent by mass or more, or more preferably 2 percent by mass or more. When the soft magnetic alloy powder has a content of Si of 5.5 percent by mass or less, on the other hand, the content of Fe in the alloy will increase and the magnetic permeability of the magnetic body will rise. The content of Si is preferably 5 percent by mass or less, or more preferably 4.5 percent by mass or less.

Also, the soft magnetic alloy powder used in the second aspect contains Cr or Al by 0.2 to 4 percent by mass in total.

Use of a soft magnetic alloy powder containing Cr or Al by 0.2 percent by mass or more in total inhibits oxidation of Fe in the manufacturing process of magnetic body so that a magnetic body of high magnetic permeability can be obtained. When the content of Cr or Al is 4 percent by mass or less in total, on the other hand, segregation of these elements during the manufacturing process will be inhibited, while the content of Fe will increase and the magnetic permeability of the magnetic body will rise. To achieve higher magnetic permeability, preferably the total content of Cr or Al is 2 percent by mass or less.

If the soft magnetic alloy powder contains Cr, then preferably its content is 0.5 percent by mass or more from the viewpoint of achieving superior oxidation resistance.

If the soft magnetic alloy powder contains Al, then preferably its content is 1 percent by mass or less from the viewpoint of inhibiting its segregation.

Preferably with the soft magnetic alloy powder used in the second aspect, the content of Fe, which significantly affects the magnetic permeability of the magnetic body to be obtained, is maximized to the extent that desired insulating property and oxidation resistance can be achieved. A preferred content of Fe is 94 percent by mass or more, where 95 percent by mass or more is more preferred, and 96 percent by mass or more is yet more preferred.

The soft magnetic alloy powder used in the second aspect is such that its content of Si is higher than the total content of Cr and Al.

When the content of Si is higher than the total content of Cr and Al, a thin, Si-rich oxide layer of high insulating property will be formed on the surfaces of the alloy grains, and a magnetic body of high magnetic permeability can be obtained.

The grain size of the soft magnetic alloy powder used in the second aspect is not limited in any way, and the average grain size calculated from the granularity distribution measured on volume basis (median diameter ($D_{50}$)) may be adjusted to 0.5 to 30 μm, for example. Preferably the average grain size is adjusted to 1 to 10 μm. This average grain size may be measured using, for example, a granularity distribution measuring device that utilizes the laser diffraction/scattering method.

In the second aspect, it is possible, before the soft magnetic alloy powder is compacted, to heat-treat the alloy powder at a temperature of 600° C. or above in an atmosphere of 5 to 500 pm in oxygen concentration. The heat treatment forms a smooth oxide film having fewer concavities and convexities on the surfaces of the grains constituting the soft magnetic alloy powder, which will improve the compactibility and thereby increase the filling rate. Also, a magnetic body offering excellent electrical insulating property can be obtained.

Preferably the aforementioned oxide film is such that the ratio of the mass of Si to the total mass of Cr and Al (Si/(Cr+Al)), at the topmost surface, is 1 to 10. If the ratio is 1 or higher, the film will have a smoother surface having fewer minute concavities and convexities. If the ratio is 10 or lower, on the other hand, excessive oxidation is inhibited and the film stability will improve further, even though the oxide film is thin. The ratio is preferably 8 or lower, or more preferably 6 or lower. This way, such surface condition can be maintained, even when heat treatment is applied.

Here, the ratio by mass of Si to the total mass of Cr and Al at the topmost surface of the oxide film (Si/(Cr+Al)) is measured by the following method. Using an X-ray photoelectron spectrometer (PHI Quantera II, manufactured by ULVAC-PHI, Inc.), the content percentages (percent by atom) of iron (Fe), silicon (Si), oxygen (O), chromium (Cr), and aluminum (Al) are measured at the surface of the soft magnetic alloy grain on which an oxide film has been formed. As for the measurement conditions, the monochromatized AlKα ray is used as an X-ray source, and the detection area is set to 100 μmø. Then, from the obtained results, the percentages by mass (percent by mass) of the respective elements are calculated and, based on the results thereof, the ratio of the mass of Si to the total mass of Cr and Al is calculated.

In the second aspect, preferably the percentage by mass of Si at the topmost surface of the oxide film is adjusted to at least five times the level in the soft magnetic alloy part, while the percentage by mass of Cr or Al at the topmost surface of the oxide film is adjusted to at least three times the level in the soft magnetic alloy part, through the aforementioned heat treatment prior to compacting. By attaining these percentages by mass, superior flowability can be achieved.

Also, in the second aspect, preferably the aforementioned heat treatment prior to compacting is performed in such a way that, when the concentrations of Si, Cr, and Al at the topmost surface of each grain constituting the soft magnetic alloy powder before heat treatment, indicated in percent by mass, are given by $[Si_{before\ treatment}]$, $[Cr_{before\ treatment}]$, and $[Al_{before\ treatment}]$, respectively, while the concentrations of Si, Cr, and Al at the topmost surface of each grain constituting the soft magnetic alloy powder after heat treatment, indicated in percent by mass, are given by $[Si_{after\ treatment}]$, $[Cr_{after\ treatment}]$, and $[Al_{after\ treatment}]$, respectively, then $\{([Cr_{after\ treatment}]\pm[Al_{after\ treatment}])/([Cr_{before\ treatment}]+[Al_{before\ treatment}])\}>([Si_{after\ treatment}]/[Si_{before\ treatment}])$ is satisfied, or specifically, the percentage of increase in the total quantity of Cr and Al at the topmost surface of the grain due to heat treatment becomes greater than the percentage of increase in Si. By performing the heat treatment this way, a soft magnetic alloy powder having a more stable oxide film can be obtained.

Here, it should be noted that the values of $[Si_{after\ treatment}]$, $[Cr_{after\ treatment}]$, and $[Al_{after\ treatment}]$ above represent the results obtained by analyzing the topmost surface of the oxide film, using the aforementioned X-ray photoelectron spectrometer, with respect to the soft magnetic alloy powder that has been heat-treated prior to compacting, while the values of $[Si_{before\ treatment}]$, $[Cr_{before\ treatment}]$, and $[Al_{before\ treatment}]$ above represent the values obtained from such analysis by changing the measurement sample to the soft magnetic alloy grain before heat treatment.

In the second aspect, preferably the soft magnetic alloy powder is brought, through the aforementioned heat treatment prior to compacting, to satisfy Formula (1) below in terms of the relationship of its specific surface area S ($m^2/g$) and average grain size $D_{50}$ (μM).

[Math. 1]

$$\log S \leq -0.98 \log D_{50} + 0.34 \quad (1)$$

This formula is derived based on the empirical rule that the common logarithm of specific surface area S ($m^2/g$), and the common logarithm of average grain size $D_{50}$ (μm), have a linear relationship. Since the value of specific surface area of a powder is affected not only by the surface concavities and convexities of the grains constituting the powder, but also by the sizes of the grains, it cannot be asserted that a powder with a smaller value of specific surface area is constituted by smooth grains having fewer surface concavities and convexities. Accordingly, in the second aspect, the impact of the surface condition of the grain, and the impact of the grain size, on the specific surface area, are isolated according to Formula (1) above, and a soft magnetic alloy powder having a smaller specific surface area due to the former impact is considered to have a smooth surface with fewer concavities and convexities. When the relationship of S and $D_{50}$ satisfies Formula (1) above, a powder of excellent flowability will be obtained.

The specific surface area S ($m^2/g$) can be decreased further by increasing the percentage of Si present in the oxide film on the grain surface and reducing the surface concavities and convexities of the oxide film. According to an oxide film having fewer surface concavities and convexities, insulation can be maintained with a smaller film thickness, which is preferred. The percentage of Si present in the oxide film on the grain surface can be increased, as mentioned above, by raising the composition ratio of Si in the soft magnetic alloy powder or lowering the heat treatment temperature. To be specific, the relationship between the specific surface area S ($m^2/g$) and the average grain size $D_{50}$ (μm) preferably satisfies Formula (2) below, or more preferably satisfies Formula (3) below.

[Math. 2]

$$\log S \leq -0.98 \log D_{50} + 0.30 \quad (2)$$

[Math. 3]

$$\log S \leq -0.98 \log D_{50} + 0.25 \quad (3)$$

Here, the specific surface area S is measured/calculated with a fully-automated specific surface area measuring device (Macsorb, manufactured by MOUNTECH Co., Ltd.) using the nitrogen gas adsorption method. First, the measurement sample is deaerated in a heater, after which nitrogen gas is adsorbed and desorbed onto/from the measurement sample, to measure the adsorbed nitrogen quantity. Next, the monomolecular layer adsorption quantity is calculated from the obtained adsorbed nitrogen quantity using the BET 1-point method, and from this value, the surface area of the sample is derived using the area occupied by one nitrogen molecule and the value of Avogadro's number. Lastly, the obtained surface area of the sample is divided by the mass of the sample, to obtain the specific surface area S of the powder.

Also, the average grain size $D_{50}$ is measured/calculated with a granularity distribution measuring device (LA-950, manufactured by Horiba, Ltd.) that utilizes the laser diffraction/scattering method. First, water is put in a wet flow cell as a dispersion medium, and powder that has been fully crushed beforehand is introduced to the cell at a concentration that allows appropriate detection signals to be obtained, in order to measure the granularity distribution. Next, the median diameter is calculated from the obtained granularity distribution, and this value is defined as the average grain size $D_{50}$.

In the second aspect, when the aforementioned heat treatment prior to compacting is performed, preferably the thickness of the oxide film to be formed therethrough will become 10 to 50 nm. When the thickness of the oxide film is adjusted to 10 nm or more, a smooth surface covering the minute concavities and convexities of the alloy part can be formed. Also, high insulating property can be achieved. More preferably the thickness of the oxide film is adjusted to 20 nm or more. This way, the ratio of Si at the oxide film surface can be increased. Also, insulating property can be maintained even when defects occur in the oxide film, when the magnetic body is formed, as a result of compression molding that involves application of pressure. When the thickness of the oxide film is adjusted to 50 nm or less, on the other hand, drop in the smoothness of the grain surface due to uneven film thickness can be inhibited. Also, high magnetic permeability can be achieved once the magnetic body has been formed. More preferably the thickness of the oxide film is adjusted to 40 nm or less.

Here, the thickness of the oxide film is calculated by observing a cross section of magnetic grains constituting the soft magnetic alloy powder using a scanning transmission electron microscope (STEM) (JEM-2100F, manufactured by JEOL Ltd.), measuring the thickness of the oxide film as recognized by a contrast (brightness) difference (attributed to different compositions) from the alloy part inside the grain, at 10 locations on different grains at a magnification of 500,000 times, and then averaging the results.

In the second aspect, the aforementioned soft magnetic alloy powder is compacted into a prescribed shape, to obtain a compact.

The compacting method is not limited in any way and, for example, a method may be used whereby the soft magnetic alloy powder is mixed with a resin and the mixture is fed into a die or other mold and pressurized using a press, etc., after which the resin is cured.

In this case, the resin to be mixed with the soft magnetic alloy powder is not limited in any way, so long as it can bond the soft magnetic alloy powder grains together to form and retain a shape, while volatilizing through a degreasing process without leaving any carbon content, etc., behind. Examples include acrylic resins, butyral resins, vinyl resins, etc., with a decomposition temperature of 500° C. or below. Also, any of lubricants, representative examples of which include stearic acid and salts thereof, phosphoric acid and salts thereof, and boric acid and salts thereof, may be used together with, or instead of, the resin.

The additive quantity of the resin or lubricant only needs to be determined as deemed appropriate by considering the formability, shape retainability, etc., and may be, for example, 0.1 to 5 parts by mass relative to 100 parts by mass of soft magnetic alloy powder.

If a resin is mixed in when obtaining the compact, preferably degreasing is performed prior to heat treatment. The degreasing temperature, which is set according to the decomposition temperature of the resin used, is generally around 200 to 500° C. Also, preferably the degreasing atmosphere is superheated steam so as to inhibit oxidation of the soft magnetic alloy.

In the second aspect, the aforementioned compact is heat-treated in an atmosphere of 10 to 800 ppm in oxygen concentration.

By adjusting the oxygen concentration in the heat treatment atmosphere to the aforementioned range, an Si-rich oxide layer containing Si, as well as at least one of Cr and Al, can be formed to an appropriate thickness on the surfaces of the soft magnetic alloy grains. The oxygen concentration is preferably 100 ppm or higher, or more preferably 200 ppm or higher.

If the oxygen concentration in the heat treatment atmosphere is too low, a short period of heat treatment will result in insufficient formation of oxide layer and consequent lowering of insulating property, while a long period of heat treatment will make the oxide layer too thick due to diffusion of Fe, Cr, or Al into the oxide layer and the magnetic permeability will drop as a result. If the oxygen concentration in the heat treatment atmosphere is too high, on the other hand, the content of Fe, Cr, or Al in the oxide layer will increase too much, which will cause the insulating property of the oxide layer to drop.

Also, in the second aspect, the aforementioned heat treatment is performed at a temperature of 500 to 900° C.

By adjusting the heat treatment temperature to the aforementioned range, a Si-rich oxide layer containing Si, as well as at least one of Cr and Al, can be formed to an appropriate thickness on the surfaces of the soft magnetic alloy grains. The temperature of the aforementioned heat treatment is preferably 550° C. or above, or more preferably 600° C. or above. Also, the temperature of the aforementioned heat treatment is preferably 850° C. or below, or more preferably 800° C. or below.

The heat treatment period in the second aspect is not limited in any way, so long as an Si-rich oxide layer containing Si, as well as at least one of Cr and Al, is formed on the surfaces of the soft magnetic alloy grains and the soft magnetic alloy grains can be bonded together via the oxide layer; however, it is preferably 30 minutes or longer, or more preferably 1 hour or longer, from the viewpoint of ensuring that the oxide layer will have a sufficient thickness. From the viewpoint of completing the heat treatment quickly and thereby improving the productivity, on the other hand, the heat treatment period is preferably 5 hours or shorter, or more preferably 3 hours or shorter.

The heat treatment in the second aspect may be a batch process or flow process. Examples of a flow process include a method whereby multiple heat-resistant trays carrying the aforementioned compact are introduced into a tunnel furnace either intermittently or successively, to have them pass through an area, which is kept at a prescribed atmosphere and a prescribed temperature, over a prescribed period of time.

[Coil Component]

The coil component pertaining to the third aspect of the present invention (hereinafter also referred to simply as "third aspect") is constituted by a conductor wound around the aforementioned magnetic body pertaining to the first aspect.

The shape and dimensions of the magnetic body or the material and shape of the conductor are not limited in any way and may be determined as deemed appropriate according to the required characteristics.

The third aspect provides a coil component with excellent characteristics because, for its magnetic body, one having high magnetic permeability is used. Also, the element volume needed to achieve the same characteristics can be reduced, the result of which is a coil component of smaller size.

[Circuit Board]

The circuit board pertaining to the fourth aspect of the present invention (hereinafter also referred to simply as "fourth aspect") is a circuit board carrying the coil component pertaining to the third aspect.

The circuit board is not limited in structure, etc., and anything that fits the purpose may be adopted.

The fourth aspect allows for performance enhancement and size reduction by using the coil component pertaining to the third aspect.

EXAMPLES

The present invention is explained more specifically below using examples; it should be noted, however, that the present invention is not limited to these examples.

Example 1

(Preparation of Magnetic Body)

First, a soft magnetic alloy powder having a composition of Fe-3.5Si-1.5Cr (the numerical values indicate percents by mass) and an average grain size of 4.0 lam was prepared. Next, this soft magnetic alloy powder was mixed under agitation with an acrylic binder of 1.2 percent by mass, to prepare a compacting material. Next, this compacting material was introduced into a die having a compacting space corresponding to a toroid of 8 mm in outer diameter and 4 mm in inner diameter, and then uniaxially press-formed at a tonnage of 8 $t/cm^2$, to obtain a compact of 1.3 mm in thickness. Next, the obtained compact was placed for 1 hour in a thermostatic chamber kept at 150° C. to cure the binder, and then heated to 300° C. in a superheated steam furnace to remove the binder by means of pyrolysis. Next, using a quartz furnace, the compact was heat-treated at 800° C. for 1 hour in an atmosphere of 800 ppm in oxygen concentration, to obtain a toroidal magnetic body.

Also, the aforementioned compacting material was introduced into a die having a disk-shaped compacting space of 7 mm in inner diameter, and then uniaxially press-formed at a tonnage of 8 $t/cm^2$, and the obtained compact of 0.5 to 0.8 mm in thickness was treated in the same manner to obtain a disk-shaped magnetic body.

(Confirmation of Oxide Layer Structure)

The aforementioned disk-shaped magnetic body was confirmed for oxide layer structure according to the method described above. A schematic representation of the STEM-observed structure of the oxide layer is shown in FIG. 1, while the results of line analysis along line segment A-A' in FIG. 1 are shown in FIG. 2.

Figure 2:
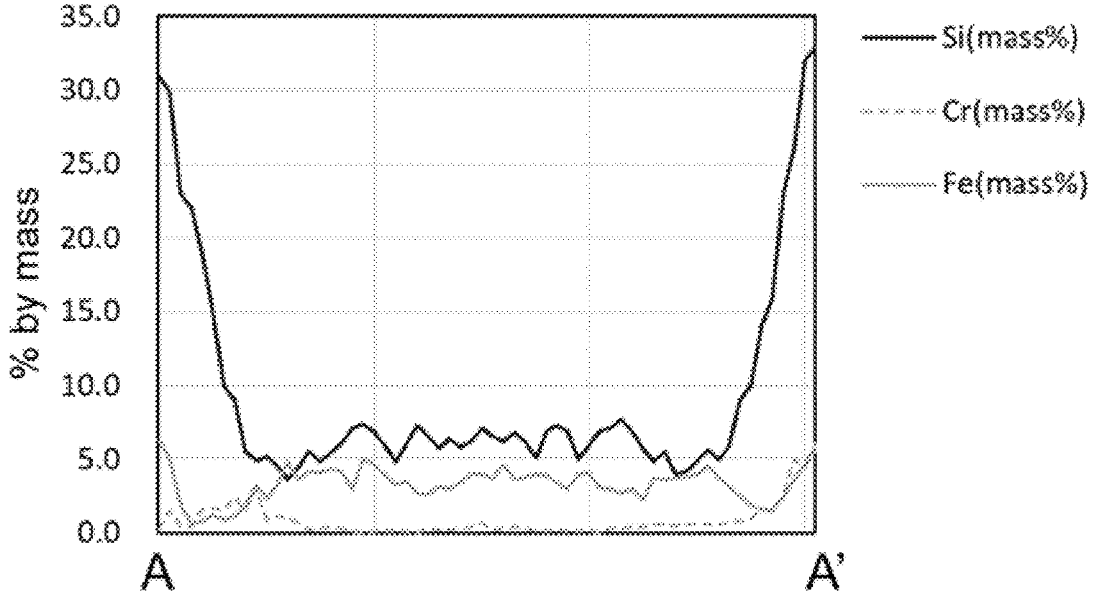
FIG. 2 shows a line analysis along A-A' in FIG. 1.

According to FIG. 2, clearly the oxide layer 2 contains Si, as well as Fe and Cr. Also, Si is the element contained in the largest quantity over the nearly entire width of the oxide layer 2, which makes it clear that, among Fe, Si, Cr, and Al, Si is contained in the largest quantity in the oxide layer 2. Furthermore, in the oxide layer 2, a Si-rich area 21 of particularly high Si content was found at the boundary part with the soft magnetic alloy grain 1, and in this area, there were locations where the content of Si was approximately five times that of Fe contained in the second largest quantity.

(Magnetic Permeability Measurement of Magnetic Body)

A coil constituted by a urethane-coated copper wire of 0.3 mm in diameter was wound around the aforementioned toroidal magnetic body by 20 turns, and the result was used as an evaluation sample.

The obtained evaluation sample was measured for specific magnetic permeability at a frequency of 10 MHz using an LCR meter (4285A, manufactured by Agilent Technologies, Inc.) as a measuring device. The obtained specific magnetic permeability was 22.

(Insulating Property Evaluation of Magnetic Body)

The insulating property of the magnetic body was evaluated based on volume resistivity and dielectric breakdown voltage.

By means of sputtering, Au films were formed all over on both sides of the aforementioned disk-shaped magnetic body, and the result was used as an evaluation sample.

The obtained evaluation sample was measured for volume resistivity according to JIS-K6911. Using the Au films formed on both sides of the sample as electrodes, voltage was applied between the electrodes to an electric field strength of 60 V/cm and the resistance value was measured, and the volume resistivity was calculated from this resistance value. The volume resistivity of the evaluation sample was 0.2 MΩ·cm.

Also, the dielectric breakdown voltage of the obtained evaluation sample was measured by using the Au films formed on both sides of the sample as electrodes and applying voltage between the electrodes, and measuring the current value. Current values were measured by gradually raising the applied voltage, and when the current density calculated from the measured current value became 0.01 $A/cm^2$, the electric field strength calculated from the applicable voltage was taken as the breakdown voltage. The dielectric breakdown voltage of the evaluation sample was 0.0018 MV/cm.

Example 2

The magnetic body pertaining to Example 2 was obtained in the same manner as in Example 1, except that the following treatment was given to the soft magnetic alloy powder.

First, the soft magnetic alloy powder was put in a container made of zirconia and placed in a vacuum heat treatment furnace.

Next, the interior of the furnace was evacuated to an oxygen concentration of 100 ppm, and then its temperature was raised to 700° C. at a rate of rise in temperature of 5° C./min, and held at that level for 1 hour to perform heat treatment, after which the furnace was cooled to room temperature, to obtain a soft magnetic alloy powder.

When the structure of the oxide layer in the obtained magnetic body was confirmed according to the same method in Example 1, results similar to those shown by the magnetic body pertaining to Example 1 were obtained. In the area of particularly high Si content in the oxide layer, which was confirmed at the boundary part with the soft magnetic alloy grain, there were locations where the content of Si was approximately 12 times that of Fe contained in the second largest quantity.

Also, when the characteristics of the obtained magnetic body were evaluated according to the same methods in Example 1, the specific magnetic permeability was 25, the volume resistivity was 103 MΩ·cm, and the dielectric breakdown voltage was 0.0047 MV/cm.

Example 3

The magnetic body pertaining to Example 3 was obtained in the same manner as in Example 1, except that, for the soft magnetic alloy powder, one having an average grain size of 2.2 μm was used.

When the structure of the oxide layer in the obtained magnetic body was confirmed according to the same method in Example 1, clearly it was similar to the structure found in the magnetic body pertaining to Example 1.

Also, when the specific magnetic permeability and volume resistivity of the obtained magnetic body were evaluated according to the same methods in Example 1, the specific magnetic permeability was 16 and the volume resistivity was 0.5 MΩ·cm.

(Evaluation of Filling Properties in Magnetic Body)

In this example, the filling properties of the soft magnetic alloy grains in a magnetic body were evaluated, in addition to the aforementioned evaluations, based on the filling rate of a disk-shaped sample and the density ratio of the flange part, to the axis part, of a drum core-shaped sample.

The disk-shaped sample was prepared according to the same method used for the disk-shaped sample in Example 1.

The obtained disk-shaped sample was measured for outer diameter and thickness to calculate the volume (measured volume). Also, the soft magnetic alloy powder used in the preparation of the disk-shaped sample was measured for true density according to the pycnometer method, and the mass of the disk-shaped sample was divided by the value of true density to calculate the volume (ideal volume) of a magnetic body to be formed whose disk-shaped sample would have a filling rate of soft magnetic alloy powder corresponding to 100 percent by volume. Then, this ideal volume was divided by the measured volume to calculate the filling rate. The obtained filling rate was 78.8 percent by volume.

The drum core-shaped sample was prepared according to the same procedure used for the disk-shaped sample, except that the die used for compacting was changed to one having a compacting space for axis part and a compacting space for flange part, to obtain a drum core-shaped sample whose axis part was 1.6 mm×1.0 mm×1.0 mm in size and whose flange part had a thickness of 0.25 mm.

The density ratio of the flange part, to the axis part, of the obtained drum core-shaped sample was calculated by collecting measurement samples from the axis part and flange part of the sample, respectively, and measuring the volumes of the respective samples according to the fixed volume expansion method, while also measuring the masses of the respective samples, and then calculating the densities of the respective parts from the measured values to obtain the ratio thereof. With this sample, whose flange part and axis part are made from the same type of material, the density ratio equals the ratio of filling rates. The obtained density ratio was 0.90.

Example 4

The magnetic body pertaining to Example 4 was obtained in the same manner as in Example 3, except that the following treatment was given to the soft magnetic alloy powder.

First, the soft magnetic alloy powder was put in a container made of zirconia and placed in a vacuum heat treatment furnace.

Next, the interior of the furnace was evacuated to an oxygen concentration of 10 ppm, and then its temperature was raised to 700° C. at a rate of rise in temperature of 5° C./min, and held at that level for 1 hour to perform heat treatment, after which the furnace was cooled to room temperature, to obtain a soft magnetic alloy powder.

When the thickness of the oxide film formed on the grain surface, with respect to the soft magnetic alloy powder that had received this treatment, was confirmed according to the method described above, the result was 30 nm.

When the structure of the oxide layer in the obtained magnetic body was confirmed according to the same method in Example 1, results similar to those shown by the magnetic body pertaining to Example 2 were obtained.

Also, when the specific magnetic permeability and volume resistivity of the obtained magnetic body were evaluated according to the same methods in Example 1, the specific magnetic permeability was 22 and the volume resistivity was 100 MΩ·cm.

When the filling properties of the soft magnetic alloy grains in the magnetic body were evaluated according to the same methods in Example 3, the filling rate was 80.5 percent by volume and the density ratio was 0.93.

Comparative Example 1

The magnetic body pertaining to Comparative Example 1 was obtained in the same manner as in Example 1, except that the atmosphere used for heat treatment at 800° C. for 1 hour was changed to air.

When the structure of the oxide layer in the obtained magnetic body was confirmed according to the same method in Example 1, the oxide layer contained Si, as well as Fe and Cr, and Si was contained in the largest quantity in the boundary part with the soft magnetic alloy grain; however, Cr was found most abundant in the majority of the areas on the interior side thereof, and the content of Cr was the highest on the whole.

Also, when the specific magnetic permeability and volume resistivity of the obtained magnetic body were evaluated according to the same methods in Example 1, the specific magnetic permeability was 14 and the volume resistivity was 0.07 MΩ·cm.

The measured characteristics of the magnetic bodies pertaining to the examples and comparative example are summarized and shown in Table 1.

TABLE 1

| | Specific magnetic permeability (at 10 MHz) | Resistivity [MΩ · cm] | Dielectric breakdown voltage [MV/cm] | Filling rate [% by volume] | Flange/axis density ratio |
|---|---|---|---|---|---|
| Example 1 | 22 | 0.2 | 0.0018 | — | — |
| Example 2 | 25 | 103 | 0.0047 | — | — |
| Example 3 | 16 | 0.5 | — | 78.8 | 0.90 |
| Example 4 | 22 | 100 | — | 80.5 | 0.93 |
| Comparative Example 1 | 14 | 0.07 | — | — | — |

— indicates that measurement was not taken.

It can be argued, from comparing Examples 1 to 4 and Comparative Example 1, that a magnetic body whose oxide layer bonding the soft magnetic alloy grains together contains Si, as well as at least one of Cr and Al, and which contains Si in the largest quantity based on mass among Fe, Si, Cr, and Al, exhibits high specific magnetic permeability. This is understood to be the result of a small thickness of the oxide layer, which increases the filling rate of the soft magnetic alloy.

Also, it can be argued, from comparing Examples 1 and 2 and comparing Examples 3 and 4, that a magnetic body offering superior electrical insulating property can be obtained by heat-treating the soft magnetic alloy powder in a low-oxygen atmosphere. This is understood to be the result of a particularly high content of Si in the Si-rich area, in the oxide layer, positioned at the boundary part with the soft magnetic alloy grain.

Furthermore, it can be argued, from comparing Examples 3 and 4, that a magnetic body with a high filling rate of soft magnetic alloy grains can be obtained by heat-treating the soft magnetic alloy powder in a low-oxygen atmosphere. This is understood to be the result of a formation, through the heat treatment, of a smooth oxide film having fewer concavities and convexities on the surface of the soft magnetic alloy powder.

In this disclosure, “a” may refer to a species or a genus including multiple species, “the invention” or “the present invention” may refer to at least one of the aspects or embodiments explicitly, necessarily, or inherently disclosed herein, and likewise, “the aspect” may refer to at least one of the embodiments or examples explicitly, necessarily, or inherently disclosed herein.

INDUSTRIAL APPLICABILITY

According to the present invention, a magnetic body of high magnetic permeability is provided. By utilizing this magnetic body, a coil component having excellent characteristics can be obtained, while the element volume needed to achieve the same characteristics can be reduced and therefore the coil component can be made smaller, and in these respects, the present invention is useful. Also, according to a preferred mode of the present invention, a magnetic body of high insulating property is provided. By utilizing this magnetic body, a coil component with large electrical current can be obtained, and in this respect, too, the present invention is useful.

What is claimed:

1. A coil component constituted by a conductor wound around a magnetic body constituted by grains of a soft magnetic alloy bonded together via an oxide layer, wherein:

the soft magnetic alloy is an alloy containing Si by 1 to 5.5 percent by mass, and Cr and/or Al by 0.2 to 4 percent by mass in total, as constituent elements, with Fe and unavoidable impurities accounting for a remainder, wherein a content of Si is more than a content of Cr and Al in total;

the oxide layer contains Si, as well as at least one of Fe, Cr, and Al, where, among Fe, Si, Cr, and Al, Si is contained in a largest quantity based on mass; and the oxide layer has:

a first Si-rich area, which contains Si by at least three times as much as an element—among Fe, Cr, and Al—whose content is a second-highest to Si based on mass, and a second Si-rich area which contains less Si than does the first Si-rich area, but contains more Si than each of Cr and Al, wherein the first Si-rich area and the second Si-rich area are layered and provided between a first grain and a second grain which are immediately adjacent to each other where an area from the first grain to the second grain consists of the first Si-rich area and the second Si-rich area, wherein a first layer of the first Si-rich area contacts the first grain of the soft magnetic alloy, and a second layer of the first Si-rich area contacts the second grain of the soft magnetic alloy so that the second Si-rich area is sandwiched by the first layer of the first Si-rich area and the second layer of the first Si-rich area between the first grain and the second grain, and more Si than each of Cr and Al, is contained over an entire thickness of the oxide layer where the oxide layer consists of the first layer of the first Si-rich area, the second layer of the first Si-rich area, and the second Si-rich area between the first grain and the second grain.

2. A circuit board carrying the coil component according to claim 1.

3. The coil component according to claim 1, wherein the content of Si based on mass in the first Si-rich area is ten times and more that of the element whose content is the second highest to Si.

4. The coil component according to claim 1, wherein the oxide layer contains Si, Fe, and at least one of Cr and Al.

5. The coil component according to claim 4, wherein the oxide layer contains Si, Fe, and Cr.

6. The coil component according to claim 4, wherein the oxide layer contains Si, Fe, and Al.

7. The coil component according to claim 4, wherein the oxide layer contains Si, Fe, Cr, and Al.

8. The coil component according to claim 1, wherein the soft magnetic alloy contains Si by 1 to 5.5 percent by mass, and Cr by 0.5 to 4 percent by mass, as constituent elements, with Fe and unavoidable impurities accounting for a remainder.

9. The coil component according to claim 1, wherein the soft magnetic alloy contains Si by 1 to 5.5 percent by mass, and Al by 0.2 to 1 percent by mass, as constituent elements, with Fe and unavoidable impurities accounting for a remainder.

10. The coil component according to claim 1, wherein the soft magnetic alloy contains Si by 1 to 5.5 percent by mass, Cr by at least 0.5 percent by mass, and Al by at least 0.2 percent by mass, wherein a content of Cr and Al in total is no more than 4 percent by mass, as constituent elements, with Fe and unavoidable impurities accounting for a remainder.

* * * * *